Sept. 28, 1948.  J. J. PALOTSEE  2,450,294
HONE ADAPTER
Filed July 24, 1946

Fig. 1ª

Inventor
John J. Palotsee
By
Attorneys

Patented Sept. 28, 1948

2,450,294

UNITED STATES PATENT OFFICE 2,450,294

HONE ADAPTER

John J. Palotsee, Youngstown, Ohio

Application July 24, 1946, Serial No. 686,049

19 Claims. (Cl. 51—184.1)

This invention is a novel hone adapter for use in connecting adjustable hones for grinding polishing bores in various castings to the vertical driving spindles of honing or other similar machines; and the principal object of the invention is to provide a simple and efficient flexible adapter embodying certain novel features of construction hereinafter set forth.

I will explain the invention with reference to the accompanying drawings, which illustrate one practical embodiment thereof, to enable others familiar with the art to adopt and use the same; and will summarize in the claims the novel features of construction, and novel combinations of parts, for which protection is desired.

Figure 1:
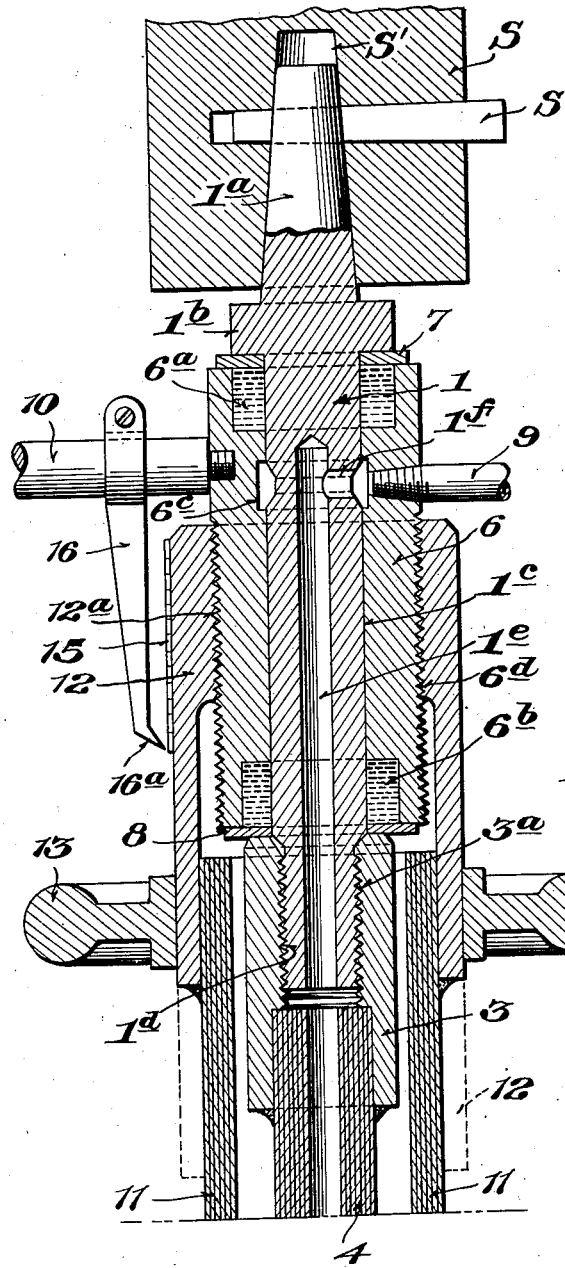
Figure 1:
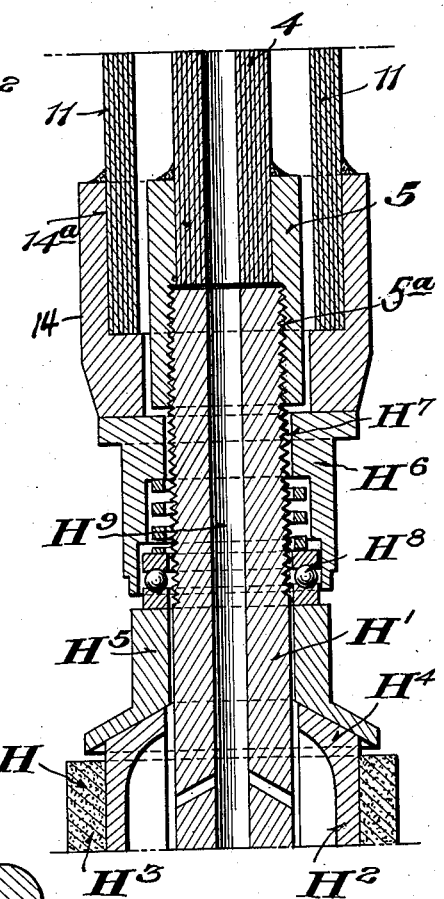

In said drawings:

Figures 1 and 1a together show a verttical section through my flexible adapter.

The hone per se, indicated at H is preferably but not necessarily of the general type illustrated in my U. S. Letters Patent Nos. 2,269,378 dated January 6, 1942; 2,232,463 dated October 19, 1943; or 2,338,963 dated January 11, 1944; although any other type hone may be utilized which has a pilot spindle H' having a threaded end H7 having spaced series of hexagonal, square, or other polygonal tapered enlargements therein adjacent its ends upon which blade holders H2 are axially slidably mounted so as to be radially shiftable inwardly or outwardly with respect to the axis of the spindle H', the hone holders H2 carrying the abrasive stones H3 and having beveled ends H4 engaged by a collar H5 which is axially movable on the spindle H' when shifted by a second collar H6 on the spindle H', an anti-friction bearing H8 being interposed between the collars H5 and H6. The particular form of the hone, however, forms no part of my present invention, provided the spindle H' is provided with a threaded end H7, as shown in Fig. 1a, and utilizes a slidable hone diameter adjusting collar such as H6.

My flexible adapter comprises a drive spindle 1 having a tapered upper end 1a adapted to seat in a correspondingly tapered bore S' in the lower end of the machine spindle S, the end 1a being maintained therein by a tapered key S2 which transfixes the recess S' and passes through a hole provided therefor in the upper end 1a of spindle 1. Below the tapered upper end 1a is an enlarged head 1b, below which the spindle 1 is reduced in diameter, as at 1c and is provided on its lower end with a further reduced extension 1d which is exteriorly threaded for the purpose hereinafter set forth.

Threaded upon the portion 1d of spindle 1 is the upper head 3 of an inside flexible driving cable 4, head 3 having a bore which is threaded as at 3a to receive the threaded end 1d of spindle 1, said bore having an enlarged lower end receiving an upper end of the inside flexible cable 4 which is welded thereto, as shown in the drawing.

At the lower end of the inside flexible cable 4 is the lower head 5 (Fig. 1a) similar to the upper head 3, the same having a bore 5a which is threaded to receive the threaded upper end H7 of the hone spindle H', as shown, the lower end of the flexible inside cable 4 entering a reduced upper portion of the bore in head 5 and being welded thereto.

As shown in Fig. 1a, the spindle H' of the hone contains an axial bore H9 having lateral branches discharging beneath the hone stones through which lubricant is provided for lubricating the hone H while in operattion, bore H9 communicating with the bore of the flexible cable 4 which latter communicates with a bore 1e in the adapter spindle 1, which bore terminates below the head 1b and is provided with lateral ports 1f adjacent its upper end for the purpose hereinafter set forth, whereby oil may be admitted into the bore 1e.

Around the upper end of the spindle 1 is an oil bushing 6 extending between the head 1b and the upper end of the upper head 3 of the flexible cable 4. At the upper and lower ends of the bore of bushing 6 are enlargements 6a and 6b respectively, adapted to contain oil seals, the upper recess 6a being closed by a brass washer 7 engaging the head 1b, and the lower recess 6b being closed by a brass washer 8 interposed between the lower end of bushing 6 and the upper end of the head 3, as shown.

Within the bore of the bushing 6 opposite lateral ports 1f is an enlarged annular recess 6c which is supplied with oil or other lubricant through a pipe 9, as shown in Fig. 1, whereby same is introduced into the bore 1e of the spindle, the oil passing down into the bore H9 of the hone H, the passage of oil along the spindle 1 above and below bushing 6 being arrested by the oil seals in recesses 6a—6b.

The exterior of bushing 6 is threaded as at 6d, and extending radially from the upper end of bushing 6 is an arm 10 having a threaded connection with the bushing, said arm being provided for the purpose of permitting the operator to hold the bushing 6 against rotation while operating the hone.

Around the inside flexible cable 4 is an outside flexible cable 11 which is adapted to be shifted axially to effect hone adjustment. Secured to the upper end of the outside flexible cable 11 is an upper head 12 of tubular shape, having a reduced bore at its upper end threaded as at 12a to directly engage the threads 6d of the oil bushing 6, the upper end of cable 11 entering the lower end of the bore of head 12 and being welded thereto, as shown. A hand wheel 13 is secured preferably by welding, on the lower end of head 12, said wheel providing means for rotating the outside cable 11 to effect hone adjustment. The head 12, as shown in Fig. 1, is in its uppermost position but as the hand wheel 13 is rotated in the proper direction, the head 12 will travel down the oil bushing 6 and assume a position such as shown in dotted lines in Fig. 1. The lower end of the outside flexible cable 11 carries a lower tubular head 14 having a bore 14a receiving the lower end of the cable 11, the same being welded therein, as shown. The lower end of head 14 directly engages the upper end of the adjusting collar H6 of the hone H, so that when the outside cable 11 is raised or lowered the collar H6 on the hone will be correspondingly shifted to increase or decrease the working diameter of the hone stones H3.

In order to indicate to the operator the amount of rotation of hand wheel 13 necessary to effect any desired increase or decrease in the diameter of the hone H, I preferably provide on the upper head 12 of the outer flexible cable 11 a calibrated scale 15, cooperating with an indicator 16, mounted upon the arm 10 of bushing 6, or rigidly secured thereto, whereby the operator may visually determine the increase or decrease in the hone diameter, as arm 10 is held stationary and the hand wheel 13 rotated. The adjustment of hand wheel 13 may be made while the hone is in operation, since during operation the arm 10 may be held stationary either manually or by contact with a side frame member or the like of the honing machine, to prevent the oil bushing 6 from rotating, the adapter spindle 1 rotating within the bushing 6.

Obviously, as the driving spindle S of the honing machine is rotated, the adapter spindle 1 and the hone H will be rotated; and as the spindle S travels vertically, the hone H will travel therewith. Instead of utilizing the tapered end connection 1a of spindle 1 to the machine spindle S, the same may be attached to the spindle by threading or otherwise.

The above construction forms a very simple, novel and efficient adapter for adjustable hones and is so constructed that the spindle H' of the hone is supported flexibly, the same being secured directly to the inside flexible cable 4, through which flexible cable and spindle H' of the hone H lubricating oil is supplied. The outer flexible cable 12 is axially movable with respect to the inner cable 4 and serves as a flexible means for shifting the collar H6 of the hone which directly controls the working diameter of the hone.

Obviously, any type of adjustable hone having a spindle H' which may or may not be provided with an oil bore H9 and lateral branches but which has an adjusting collar H6 thereon, may be used with my adapter, and I therefore do not limit my invention to use with the particular hone H shown in the drawing; nor do I limit the invention to the exact form shown in the drawing, for obviously changes may be made therein within the scope of the claims.

I claim:

1. In combination with a hone having a hone spindle upon which an annular series of hone stones are mounted, an adapter spindle adapted to be mounted upon a rotary driving spindle for rotation therewith; a flexible cable having heads at both ends mounted on the adapter spindle and hone spindle respectively; said adapter spindle, cable and hone spindle having registering bores leading into the hone, the hone spindle bore having branches which discharge within the hone behind the series of stones; and means for introducing lubricant into the bore of the adapter spindle.

2. In a combination as set forth in claim 1, said hone spindle and adapter spindle being threaded; and said heads comprising collars into which the ends of the cable are fixedly secured, said heads having tapped bores receiving the threaded ends of the adapter spindle and hone spindle respectively.

3. In a combination as set forth in claim 1, said introducing means comprising an oil bushing around the adapter spindle within which the said spindle freely rotates; means for preventing rotation of the bushing; said bushing having an annular recess in its bore; a conduit supplying lubricant to said recess; said adapter spindle having lateral ports therein registering with the recess and communicating with the adapter spindle bore; and oil seals in the bore of the bushing above and below the said recess.

4. In combination with a hone having a hone spindle upon which an annular series of hone stones are mounted for radial adjustment upon axial movement of a collar on said hone spindle, an adapter spindle adapted to be mounted upon a rotary driving spindle for rotation therewith; an inner flexible driving cable having heads at its ends mounted on the adapter spindle and hone spindle respectively; a bushing around the adapter spindle within which the said spindle freely rotates; means for preventing rotation of the bushing; and an outer flexible cable around the first mentioned cable having heads engaging the bushing and the collar on the spindle hone, said bushing engaging head being axially movably mounted on the bushing to effect shifting of the collar on the hone to radially adjust the hone stones.

5. In a combination as set forth in claim 4, said hone spindle and adapter spindle being threaded; and said heads on the inner cable comprising collars into which the ends of the inner cable are fixedly secured, and said heads on the inner cable having tapped bores receiving the threaded ends of the adapter spindle and hone spindle respectively.

6. In a combination as set forth in claim 4, the bushing engaging head on the outer cable having a bore in which the upper end of the cable is fixedly secured, said bore being tapped and engaging threads on the said bushing; means for rotating said head; and the other head of the outer cable having a bore in which the lower end of the cable is fixedly secured.

7. In combination with a hone having a hone spindle upon which an annular series of hone stones are mounted for radial adjustment upon axial movement of a collar on said hone spindle, an adapter spindle adapted to be mounted upon a rotary driving spindle for rotation therewith; an inner flexible driving cable having heads at its ends mounted on the adapter spindle and hone spindle respectively; said adapter spindle, inner cable, and hone spindle having registering bores leading into the hone, the hone spindle bore having branches which discharge within the hone beind the series of stones; a bushing around the adapter spindle within which the said spindle freely rotates; means in the bushing for introducing lubricant into the bore of the adapter spindle; means for preventing rotation of the bushing; and an outer flexible cable around the first mentioned cable having heads engaging the bushing and the collar on the hone spindle, said bushing engaging head being axially movably mounted on the bushing to effect shifting of the collar on the hone to radially adjust the hone stones.

8. In a combination as set forth in claim 7, said hone spindle and adapter spindle being threaded; and said heads on the inner cable comprising collars into which the ends of the inner cable are fixedly secured, and said heads on the inner cable having tapped bores receiving the threaded ends of the adapter spindle and the hone spindle respectively.

9. In a combination as set forth in claim 7, the bushing engaging head on the outer cable having a bore in which the end of the cable is fixedly secured, said bore being tapped and engaging threads on said bushing; a hand wheel mounted on said head; and the other head of the outer cable having a bore in which the lower end of the outer cable is fixedly secured.

10. In a combination as set forth in claim 7, said bushing having an annular recess in its bore; and said introducing means comprising a conduit supplying lubricant to said recess; said adapter spindle having lateral ports therein registering with the recess and communicating with the bore in said spindle; and oil seals in the bore of the bushing above and below the said recess.

11. In combination with a hone having a threaded hone spindle upon which an annular series of hone stones are mounted for radial adjustment upon axial movement of a collar on said hone spindle adjacent the threaded end, an adapter spindle adapted to be mounted upon a rotary driving spindle for rotation therewith, said adapter spindle having a threaded extension at its inner end; an inner flexible driving cable having heads at its ends mounted on the extension and on the hone spindle respectively; a bushing around the adapter spindle within which said spindle freely rotates; means for preventing rotation of the bushing; an outer flexible cable around the first mentioned cable having heads engaging the bushing and the collar on the hone, said bushing engaging head being axially movably mounted on the bushing to effect shifting of the collar on the hone spindle to radially adjust the hone stones; and means for visually indicating the amount of movement of the bushing engaging head on the bushing to denote the expansion and contraction of the hone diameter.

12. In a combination as set forth in claim 11, said heads on the inner cable comprising collars into which the ends of the inner cable are fixedly secured, and having tapped bores receiving the threaded ends of the adapter spindle extension and the threaded end of the hone spindle respectively.

13. In a combination as set forth in claim 11, the bushing engaging head on the outer cable having a bore in which the upper end of the cable is fixedly secured, said bore being tapped and engaging the threads on said bushing; a hand wheel mounted on said head; and the other head having a bore in which the lower end of the outer cable is fixedly secured.

14. In a combination as set forth in claim 11, said indicating means comprising calibrations on the bushing engaging head of the outer cable; and an indicator arm carried by the bushing and disposed across said calibrations.

15. In combination with a hone having a threaded hone spindle upon which an annular series of hone stones are mounted for radial adjustment upon axial movement of a collar on the hone spindle adjacent the threaded end, an adapter spindle adapted to be mounted upon a rotary driving spindle for rotation therewith, said adapter spindle having a threaded extension at its inner end; an inner flexible driving cable having heads at its ends mounted on the extension and on the hone spindle respectively; said adapter spindle, cable, and hone spindle having registering bores leading into the hone, and the spindle bore having branches which discharge within the hone behind the series of stones; an oil bushing around the adapter spindle within which the said spindle freely rotates; means in the bushing for introducing lubricant into the bore of the adapter spindle; means for preventing rotation of the bushing; an outer flexible cable around the first mentioned cable having heads engaging the oil bushing and the collar on the hone, said bushing engaging head being axially movably mounted on the oil bushing to effect shifting of the collar on the hone to radially adjust the hone stones; and means for visually indicating the amount of movement of the bushing engaging head to denote the expansion and contraction of the hone diameter.

16. In a combination as set forth in claim 15, said heads on the inner cable comprising collars into which the ends of the inner cable are fixedly secured, and having tapped bores receiving the threaded ends of the adapter spindle extension and the threaded end of the hone spindle respectively.

17. In a combination as set forth in claim 15, the bushing engaging head on the outer cable having a bore in which the upper end of the cable is fixedly secured, said bore being tapped and engaging the threads on said bushing; a hand wheel mounted on said head; and the other head having a bore in which the lower end of the cable is fixedly secured.

18. In a combination as set forth in claim 15, said bushing having an annular recess in its bore, and said introducing means comprising a conduit supplying lubricant to said recess; said adapter spindle having lateral ports therein registering with the recess and communicating with the bore in the said adapter spindle; and oil seals in the bore of the bushing above and below the said recess.

19. In a combination as set forth in claim 15, said indicating means comprising calibrations on the upper head of the outer cable; and an indicator arm carried by the oil bushing and overlying the calibrations.

JOHN J. PALOTSEE.

REFERENCES CITED

The following references are of record in the file of this patent:

UNITED STATES PATENTS

| Number | Name | Date |
| --- | --- | --- |
| 978,749 | Hollis | Dec. 13, 1910 |
| 1,269,506 | Preston | June 11, 1918 |
| 1,810,336 | Bennington | June 16, 1931 |
| 1,918,077 | Agostoni | July 11, 1933 |
| 1,925,709 | Zimmerman | Sept. 5, 1933 |
| 1,931,986 | Heuer | Oct. 24, 1933 |
| 2,188,567 | Connor | Jan. 30, 1940 |